United States Patent [19]
Boella et al.

[11] Patent Number: 5,173,654
[45] Date of Patent: Dec. 22, 1992

[54] VOLTAGE-REGULATOR CIRCUIT FOR A SYSTEM FOR RECHARGING THE BATTERY OF A MOTOR VEHICLE

[75] Inventors: Marcello Boella, Ivrea; Valerio Giorgetta, Turin; Paola Redivo, Aosta, all of Italy

[73] Assignee: Marelli Autronica SpA, Milan, Italy

[21] Appl. No.: 780,298

[22] Filed: Oct. 22, 1991

[30] Foreign Application Priority Data
Oct. 22, 1990 [IT] Italy ............................. 67810 A/90

[51] Int. Cl.⁵ ............................................. H02J 7/14
[52] U.S. Cl. .................................... 322/25; 322/27; 322/28
[58] Field of Search ............................. 322/25, 27, 28

[56] References Cited
U.S. PATENT DOCUMENTS 3,984,755 10/1976 Lehnhoff et al. ................ 322/28
4,634,954 1/1987 Kato et al. ........................ 322/28
4,658,200 4/1987 Kouge ............................... 322/25
4,739,243 4/1988 Iwatani et al. ................ 322/28 X
4,937,514 6/1990 Iwatani ........................... 322/28 X
5,083,038 1/1992 Fukushima et al. ........... 322/28 X
5,099,189 3/1992 Iwaki et al. ........................ 322/25

Primary Examiner—R. J. Hickey
Attorney, Agent, or Firm—Sughrue Mion Zinn Macpeak & Seas

[57] ABSTRACT

The voltage-regulator circuit includes:
a driver transistor whose collector-emitter path is in series with the field winding between two poles of a source of a direct-current voltage, and
a control circuit adapted to drive the transistor in an on-off manner in dependence on the value assumed by the voltage supplied by the generator in comparison with a reference voltage and in dependence on the field current detected by a resistor connected to the transistor.

14 Claims, 1 Drawing Sheet

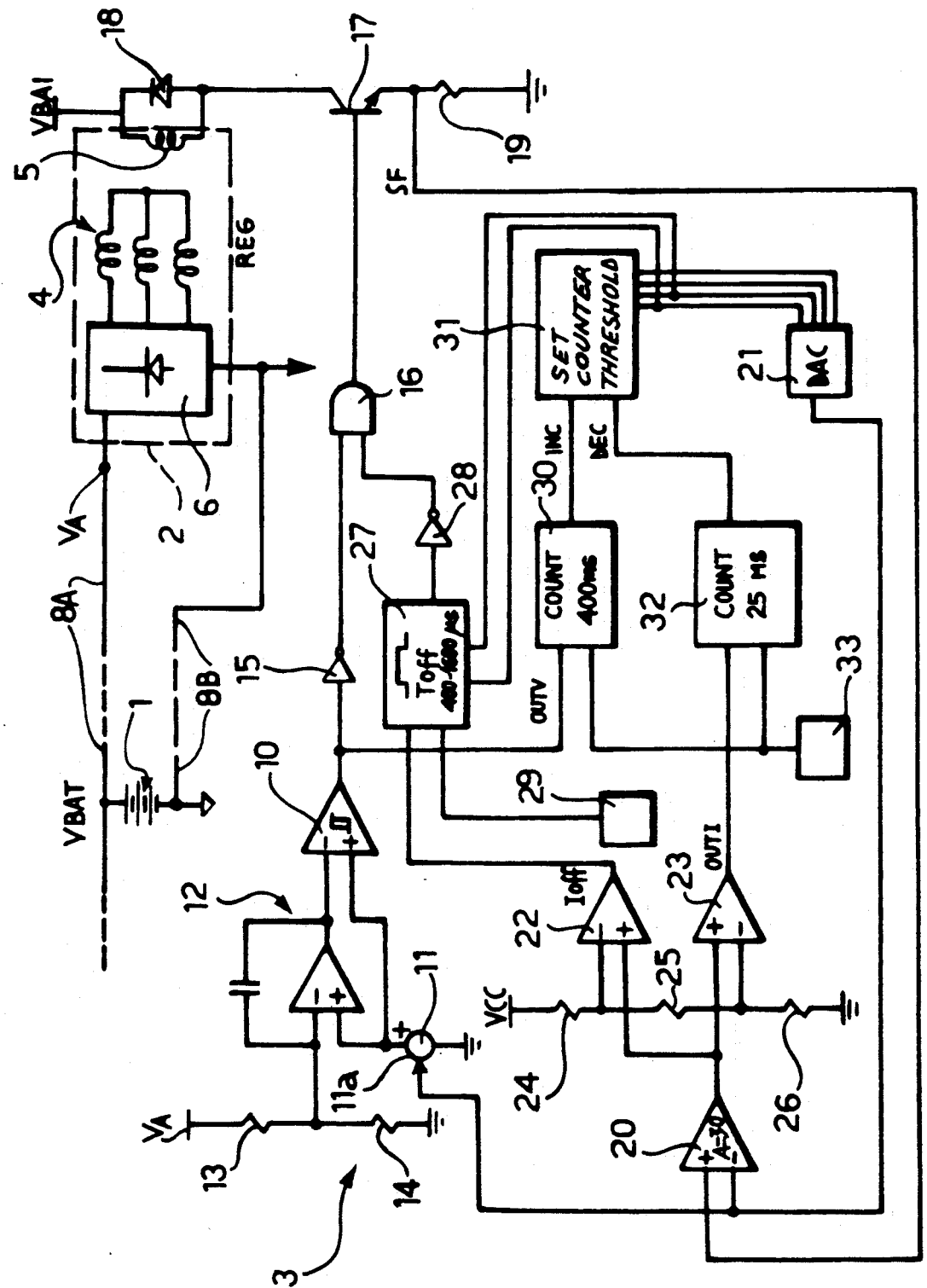

VOLTAGE-REGULATOR CIRCUIT FOR A SYSTEM FOR RECHARGING THE BATTERY OF A MOTOR VEHICLE

DESCRIPTION

The present invention relates to a voltage-regulator circuit for a system for recharging the battery of a motor vehicle which includes an electrical generator including an alternator with an armature winding and a field winding, and a rectifier, and in which the output of the generator is connected to a terminal of the battery.

More specifically, the invention relates to a voltage-regulator circuit including:

a driver transistor whose collector-emitter path is in series with the field winding of the generator between the two poles of a source of a direct-current voltage, and a control circuit for driving the transistor in an on-off manner in dependence on the value assumed by the voltage supplied by the generator in comparison with a reference voltage.

The voltage-regulator circuit according to the invention is characterised in that it also includes:

sensor means for supplying an electrical signal indicative of the excitation current flowing in the field winding of the generator, a comparison circuit for preventing the driver transistor from becoming conductive for a predetermined period of time when the excitation current in the field winding exceeds a pre-established maximum threshold value, and first timing control means connected to the control circuit for increasing the maximum threshold value if the voltage supplied by the generator remains below the reference voltage for more than a pre-established period of time.

Conveniently, the first control means are arranged to increase the maximum current threshold value with a first pre-established time constant in dependence on the time for which the voltage supplied by the generator remains below the reference voltage.

As will become clearer from the following, the voltage-regulator circuit according to the invention prevents the battery-recharging system and, in particular, the generator from causing abrupt variations in the resisting torque borne by the engine. In fact, the alternator of the recharging system can cause a considerable increase in the resisting torque borne by the internal combustion engine, for example, when an electrical load of a certain magnitude is switched on. In these circumstances, the voltage-regulator circuit increases the field current drawn in order to increase the supply, which inevitably increases the resisting torque borne by the internal combustion engine. This may cause problems when the internal combustion engine is idling and particularly when the engine is cold.

According to the prior art, in order to prevent this problem, the excitation current is made to change gradually according to a predetermined law and this is typically achieved by means of the internal voltage-regulating loops of the regulator circuit and hence with no direct control of the intensity of the current in the field winding. These solutions have not been found to be very satisfactory since in some circumstances (for example, in the event of sudden increases in the rate of rotation of the internal combustion engine or in the event of the sudden disconnection of an electrical load) the slowing of the action of the voltage-regulating loops may cause the alternator to supply excess currents of considerable intensity. Moreover, the current supplied may be subject to instability and pulsing.

These problems are overcome by the voltage-regulator circuit according to the invention.

Further characteristics and advantages of the invention will become clear from the detailed description which follows with reference to the appended drawing provided purely by way of non-limiting example, which is a diagram, partially in block form, of the voltage-regulator circuit according to the invention.

With reference to the drawing, a recharging system for recharging the battery 1 of a motor vehicle includes a current generator, generally indicated 2, and an associated voltage-regulator circuit, generally indicated 3.

In known manner, the generator 2 includes an alternator with a three-phase armature winding 4 (connected in a star arrangement in the embodiment shown by way of example) and a field winding 5. The armature winding 4 of the alternator is connected to a full-wave, three-phase rectifier 6 formed with semiconductor diodes. The output of the rectifier 6 constitutes the output of the generator 2 as a whole and is connected to a pole of the battery 1 by means of a connecting wire $8a$. The negative pole of the battery 1 is connected to earth and to the earth of the alternator by means of a wire $8b$. The voltage output by the generator 2 is indicated $V_A$ and the voltage supplied by the battery 1 is indicated VBAT. These voltages differ by the voltage drop in the connecting wires $8a$ and $8b$.

The voltage-regulator circuit includes a threshold comparator 10 with hysteresis which has a non-inverting input connected to a reference-voltage generator 11 and an inverting input connected to the output of an integrator circuit 12. The input of the integrator circuit is connected to the central tap of a voltage divider formed by two resistors 13 and 14 which divide the voltage $V_A$ output by the generator 2 in a predetermined ratio.

The output of the threshold comparator 10 is connected by an inverter 15 to a first input of an AND gate 16 whose output is connected to the base of a power driver transistor 17 which, in the embodiment shown by way of example, is of the npn type.

The field winding 5 of the generator 2 is connected between the collector of the transistor 17 and the positive pole of the battery 1. A recirculating diode 18 is connected in parallel with the winding 5.

A resistor 19 is arranged between the emitter of the transistor 17 and earth and acts as a sensor of the excitation current flowing in the field winding 5 in operation. The non-earthed terminal of the resistor is connected to a first input of a differential amplifier 20, a second input of which is connected to the output of a digital/analog converter 21.

As will become clearer from the following, the converter 21 supplies the differential amplifier 20 with a (variable) reference voltage and the amplifier 20 outputs a signal proportional to the difference between the voltage across the resistor 19 and the reference voltage.

The output of the differential amplifier 20 is connected to the inputs of two non-inverting threshold comparators, indicated 22 and 23. The comparators compare the signal supplied by the differential amplifier 20 with respective fixed reference voltages whose values are determined by three resistors 24, 25, 26 arranged between the outputs of a stabilised direct-current voltage generator VCC (not shown). The comparator 22 compares the input signal with a voltage threshold higher than the voltage threshold associated with the comparator 23.

The two comparators 22 and 23 together define a window or acceptable range for the signal output by the differential amplifier 20.

The output of the comparator 22 is connected to a control input of a timer 27 which is adapted to output pulses (with a signal "1") of a predetermined duration which, conveniently, is variable, for example, between 400 and 1600 microseconds. The timer may be formed in known manner by a logic network and an associated oscillator 29 which may have a frequency, for example, of 5 kHz.

The output of the timer 27 is connected to the other input of the AND gate 16 by an inverter 28.

In operation, when the output of the timer 27 is at level "0", the AND gate 16 is enabled to transfer the driving signal output by the threshold comparator 20 to the base of the transistor 17.

When the output of the timer 27 is at level "1", however, the AND gate 16 is "blocked" and the transistor 17 becomes non-conductive. The current in the field winding 5 is correspondingly reduced.

The output of the threshold comparator 10 is connected to a count-enabling input of a counter 30 whose output is connected to the add input of a further, bidirectional counter 31. The subtract input of that counter is connected to the output of a counter 32 whose count-enabling input is connected to the output of the comparator 23. When the output of the comparator 23 is at level "1", the counter 32 is reset and starts to count again.

The respective count inputs of the counters 30 and 32 are connected to the output of the same oscillator 33 which has a frequency, for example, of 80 Hz.

In the embodiment illustrated, the counter 31 has a four-bit output and hence four output terminals which are connected to corresponding inputs of the digital-/analog converter 21.

In operation, if the current flowing in the field winding 5 stays between pre-established maximum and minimum limits, the signal output by the differential amplifier 20 is always between the two thresholds associated with the comparators 22 and 23. In these conditions, the timer circuit 27 and the counter 32 are stopped and the AND gate 16 transfers the driving signal output by the threshold comparator 10 to the base of the driver transistor 17.

If the current flowing in the field winding 5 exceeds an upper limit corresponding to the threshold associated with the comparator 22, the latter activates the timer circuit 27 which blocks the AND gate 16, preventing the transistor 17 from becoming conductive so that the current in the field winding 5 starts to decrease.

If, in operation, the voltage $V_A$ supplied by the generator 2 falls and remains below the reference voltage from the generator 11, at least for a pre-established period of time (for example 400 ms), the counter 30 supplies a pulse to the counter 31 to make it count in the increasing direction. This raises the voltage output by the digital/analog converter 21 so that the voltage output by the amplifier 20 can reach the threshold associated with the upper comparator 22 less quickly. In practice, this is the equivalent of raising the upper limit for the current in the field winding at which the timer 27 is activated. As long as the voltage $V_A$ remains below that supplied by the generator 11, the counter 30 causes successive increases in the count of the counter 31, and hence successive increases in the voltage output by the converter 21, at its time constant (which, as stated, may, for example, be 400 ms). This means that, in these circumstances (which occur, for example, after an electrical load of the system in the motor vehicle has been switched on), the excitation current in the field winding 5 is increased to compensate for the increased current requirement but in a gradual and controlled manner with a time constant which is substantially that of the counter 30.

On the other hand, when, as a result of changed operating circumstances, the excitation current in the field winding 5 falls below a pre-established lower limit which corresponds to the threshold associated with the comparator 23, this comparator enables the counter 32 which, with a time constant (for example, of 25 ms) which is considerably shorter than that of the counter 30, causes the count reached by the counter 31 to be decreased and the reference voltage which the converter 21 applies to the differential amplifier 20 to be reduced correspondingly.

As can be seen in the drawing, two outputs of the counter 31, which correspond to the most significant bits, are connected to corresponding control inputs of the timer device 27 and the latter is conveniently arranged to output a pulse whose duration is variable, for example, between 400 and 1600 ms in dependence on the values assumed by the most significant bits of the output of the counter 31. In particular, the timer 27 is arranged to reduce the duration of the signal of the timer 27, and hence to reduce the time for which the transistor 17 is non-conductive, when the count of the counter 31, and hence the voltage output by the digital-analog converter 21, increases.

Conveniently, the generator 11 which supplies the reference voltage to the threshold comparator 10 is of the type adapted to supply a voltage which is variable in dependence on a control signal applied to it through a control input 11a. This control input is connected to the output of the digital/analog converter 21. The generator 11 is arranged, in particular, to supply a reference voltage whose value increases when the signal at the output of the converter 21 increases. This charactersitic means that, in operation, when the current supplied by the generator 2 increases, the voltage across the battery 1 remains constant, unlike prior-art systems in which the voltage available tends to decrease with increases in the current supplied. In particular, the arrangement just described recovers, that is, compensates for, the voltage drop in the connecting wires 8a and 8b between the generator 2 and the battery 1 with the advantage that a connecting wire between the positive pole of the battery and the voltage-regulator circuit, which is necessary in systems currently in use, is no longer required.

Naturally, the principle of the invention remaining the same, the forms of embodiment and details of construction may be varied widely with respect to those described and illustrated purely by way of non-limiting example, without thereby departing from the scope of the present invention.

We claim:

1. A voltage-regulator circuit for a system for recharging the battery of a motor vehicle which includes an electrical generator including an alternator with an armature winding and a field winding, and a rectifier, in which the output of the generator is connected to a terminal of the battery, the voltage-regulator circuit including:
- a driver transistor whose collector-emitter path is in series with the field winding between the two poles of a source of a direct-current voltage;
- a control circuit for driving the transistor in an on-off manner in dependence on the value assumed by the voltage supplied by the generator in comparison with a reference voltage,
- sensor means for supplying an electrical signal indicative of the excitation current flowing in the field winding,
- a comparison circuit for preventing the driver transistor form becoming conductive for a predetermined period of time when the excitation current in the field winding exceeds a pre-established maximum threshold value, and
- first timing control means for increasing the maximum threshold value of the field current if the voltage supplied by the generator remains below the reference voltage for more than a pre-established period of time.

2. A regulator circuit according to claim 1, wherein the first control means are arranged to increase the maximum threshold value of the field current with a first pre-established time constant, in dependence on the time for which the voltage supplied by the generator remains below the reference voltage.

3. A regulator circuit according to claim 1, wherein the comparison circuit is arranged to compare a signal correlated with that supplied by the sensor means with maximum and minimum values corresponding respectively to maximum and minimum threshold values for the current in the field winding.

4. A regulator circuit according to claim 3, also including second timing control means adapted to decrease the maximum and minimum threshold values of the field current if that current falls below the minimum threshold value.

5. A regulator circuit according to claim 4, wherein the second timing control means are arranged to decrease the field current threshold values with a second pre-established time constant shorter than the first time constant, in dependence on the time for which the current in the field winding remains below the minimum threshold value.

6. A regulator circuit according to claim 2, wherein blocking circuitry is associated with the comparison circuit for preventing the driver transistor from becoming conductive for a period of time which is variable in dependence on the instantaneous value of the field-current threshold.

7. A regulator circuit according to claim 6, wherein the blocking circuitry is arranged to prevent the transistor from becoming conductive for a period of time which is variable inversely with respect to variations of the field-current threshold value.

8. A regulator circuit according to claim 1, for a recharging system in which the output of the generator is connected to the battery by at least one connecting wire, wherein the control circuit is operatively connected to the means for sensing the current in the field winding and is arranged to control the driver transistor so that the voltage across the battery remains substantially constant with variations in the current supplied to the battery by the generator.

9. A regulator circuit according to claim 8, in which the control circuit includes means for generating the reference voltage, the means for generating the reference voltage being operatively connected to the field-current sensor means and/or to the comparison circuit so as to generate a reference voltage which increases when the current flowing in the field winding increases.

10. A regulator circuit according to claim 1, wherein the current sensor means comprise a resistor connected in series with the collector-emitter path of the driver transistor.

11. A regulator circuit according to claim 10, wherein the comparison circuit includes:
- a differential amplifier for outputting a signal proportional to the difference between the voltage across the resistor and a signal supplied by a circuit for generating a variable reference signal, and
- first and second threshold comparators, for comparing the signal supplied by the differential amplifier with first, upper and second, lower fixed threshold voltages, respectively.

12. A regulator circuit according to claim 11, wherein the output of the first threshold comparator is connected to the input of a timing circuit which is adapted to prevent the driver transistor from becoming conductive for a predetermined period of time.

13. A regulator circuit according to claim 12, wherein the circuit for generating the variable reference signal includes a bidirectional counter with an increasing-count input piloted by the control circuit and a decreasing-count input controlled by the output of the second threshold comparator, and
- digital/analog converter connected to the output of the counter.

14. A regulator circuit according to claim 13, wherein the timing circuit is connected to outputs of the counter which correspond to the most significant bits of the signal output by the counter.

* * * * *